Patented June 3, 1952

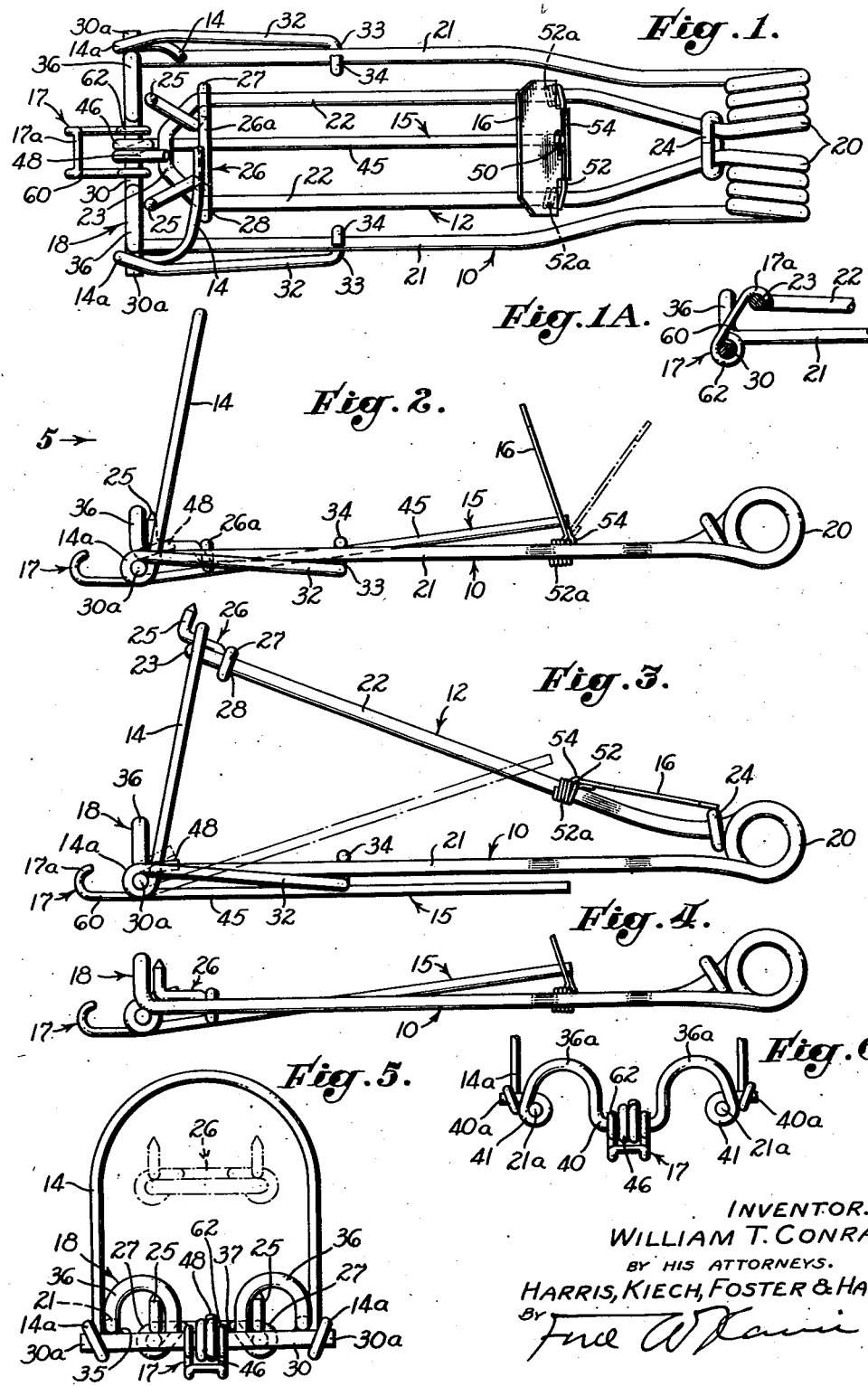

2,598,974

UNITED STATES PATENT OFFICE 2,598,974

GOPHER TRAP

William T. Conrad, Lawndale, Calif., assignor of one-half to Edward Timbs, Los Angeles, Calif.

Application July 19, 1947, Serial No. 762,156

16 Claims. (Cl. 43—80)

1

This invention relates to traps for rodents and especially to traps adapted to be inserted into small burrows produced by gophers for the purpose of trapping gophers working therein.

In a number of parts of the country gophers have become quite prolific and a menace to agriculturists because of heavy damage to orchards and crops. Trapping and poisoning efforts are continually in progress, but gophers soon become wise, both with respect to traps and poisoning, and, in the case of traps manage to avoid the conventional trap and in a great many instances will even succeed in springing the trap without being caught. It is obvious, therefore, that a trap will be much in demand which cannot be sprung without catching the gopher and which will not serve unduly to cause the gopher to increase his alertness. Concerning the matter of alertness, there is a conventional heavy spring wire trap provided with two prongs which, when set, lie at opposite sides of the burrow or hole into which the trap is inserted. Since these prongs are not shielded, and ordinarily are not covered with earth, the gopher often contacts them in pushing earth ahead and backs away without springing the trap. If these prongs are covered with earth, small rocks are frequently caught between the prongs as they close so that sufficient closing is prevented and the gopher can pull himself loose without serious injury.

One object of this invention is to provide a heavy spring wire trap using prongs so arranged and guarded when set that their sharp points will not contact the gopher as he enters the trap.

Another object is to provide a trap which is both easy to set and at the same time safe to set from the standpoint of the operator, and an incidental object is to include safety means to assist setting.

A still further object is to provide a spring wire trap which is positive in action so that the chance of the gopher's escaping from the trap is almost nil, once a gopher has entered it far enough to spring it. An additional incidental object is to provide a spring wire trap, or equivalent construction, employing a retainer member against which the gopher is positively forced and by which the gopher is held by a prong-carrying impaling member when the trap is sprung.

It is a still further object of the invention to provide in such a trap a retaining member which can be used when the trap is inserted into large burrows, and is adapted to be removed when the trap is to be inserted into extremely small burrows where the walls of the burrows will them-

2 selves serve as a retaining means against which the prong-carrying impaling member is forced by spring means actuating such member when the trap is sprung.

Another object of the invention is to provide a spring wire trap having sharp impaling prongs which are so arranged and so actuated that, when set, such prongs may be covered with earth, if desired, and there will be no possibility of such earth interfering with the operation of the trap.

Other objects and features of the invention will become apparent to those skilled in this art upon reference to the following specification and accompanying drawing wherein one embodiment of the invention is disclosed by way of illustration.

In the drawing:

Fig. 1 is a top plan view of a preferred form of the invention, the parts being in operative or set position;

Fig. 1A is a fragmentary elevation illustrating use of a safety hook;

Fig. 2 is a side elevation of the device set as illustrated in Fig. 1;

Fig. 3 is a side elevation showing the device in sprung position;

Fig. 4 is a side elevation similar to that of Fig. 2, but omitting the retaining bail at the forward end of the trap, that is, at the left end of the trap as shown in the drawing;

Fig. 5 is a front end elevation as indicated by the arrow 5 of Fig. 2, the impaling prongs being indicated in an intermediate position by broken lines; and Fig. 6 is a front elevational detail similar to a corresponding portion of the showing of Fig. 5, and illustrating a modified form of front bar construction.

Having particular reference to Figs. 1 and 3, the trap shown comprises a base member 10, an impaling arm 12, a movement limiting and retaining bail 14 for the impaling arm 12, a latch 15, a trigger plate 16, a safety hook 17, and a transverse front bar 18 which is a cross means constituting mounting means for the bail 14 and the safety hook 17. All parts are made of metal and most parts preferably are made of heavy spring wire. Thus, the base member 10 and the impaling arm 12, in the form shown, are made of a single length of appropriate spring wire having intermediate portions formed into spring coils 20 having a set tending to move the impaling arm upward from the base 10 into the position best illustrated in Fig. 3. With this construction, the base member 10 comprises two opposing legs 21 constituting the end portions of such length of spring wire, their extremities lying at the forward end of the trap, and their rearward portions extending to and merging with the coils 20. The middle portion of the spring wire constitutes an elongated closed loop comprised of two opposed rails 22 integrally connected at their forward ends by a bight 23 and positioned at their rearward ends in slightly spaced position by means of a suitable clamping wire 24 which serves at the same time to maintain a proper spacing of the two coils 20.

The forward end of the impaling arm 12 carries two forwardly projected, sharpened impaling prongs 25, these prongs 25 being turned upwardly from the bight 23 upon which they lie. The prongs are the extremities of a wire 26 of suitable stiffness which is looped around the forward ends of the rails 22 as indicated at 27, these loops being connected by an intermediate portion 26a of the wire 26. For the purpose of retaining the wire 26 and the prongs 25 in a required, fixed, operative position on the rails 22, soldering or welding 28 is relied upon.

When the impaling arm 12 is in its sprung or inoperative position as indicated in Fig. 3, the end portions of the wire 26 adjacent the impaling prongs 25 engage under the uppermost, or bight, portion of the bail 14 which thereby limits the upward movement of the impaling arm 12. As illustrated, the bail 14 is U-shaped, thereby providing two side arms which extend downward and are removably mounted adjacent the forward ends of the opposing legs 21 through the medium of loops 14a removably disposed around adjacent extremities 30a of cross means in the form of a cross-rod 30 constituting a portion of the mounting means provided by the front bar structure 18. In order to position the bail 14 so that its upper portion, when in operative position, will not extend forward beyond the path of the prongs 25, an arm 32 integral with each loop 14a is extended rearward along the respective leg 21, and the end of each arm 32 is provided with a laterally and inwardly offset finger 33 which underlies the respective leg 21 and thereby limits the forward motion of the bail 14. The inner end of each finger 33 has an upturned portion providing a detent 34 overlying the respective leg 21 and forming a hook which prevents downward movement of the respective arm 32 and also rearward movement of the bail 14. In instances where the trap may be employed without the bail 14, the latter may be removed by pressing the detents 34 inward to detach them from the legs 21 and then spreading the sides of the bail so that the loops 14a are detached from the ends 30a of the cross-rod 30, the bail 14 being thereby entirely disconnected.

In the form illustrated in Fig. 5 the cross-rod 30 is secured to the under sides of the forward extremities of the legs 21 by soldering or welding 35. At the forward extremities of the legs 21, extensions thereof are bent upward and formed into arches providing guards 36 for the sharpened impaling prongs 25 when the latter are depressed into set position. This relationship is best shown in Figs. 2 and 5 where the retaining bail 14 is employed, and also in Fig. 4 where the retaining bail 14 is removed. The downturned extremities of the arched guards 36 contact the upper edge of the crossrod 30 and are welded thereto as indicated at 37, thereby further providing a rigid attachment of the cross-rod 30 to the legs 21.

A modified form of the front bar 18 is illustrated in Fig. 6, where the arched guards 36 and the cross-rod 30 are in effect combined in a single looped and arched heavy wire 40 whose ends 40a are adapted to receive the loops 14a of the bail 14, adjacent portions 41 of the wire 40 being formed into eyes which are wrapped around and soldered to the adjacent blunt severed ends 21a of the legs 21. From the eye portions 41 the wire 40 is arched upward near each eye to form arched guards 36a corresponding with the guards 36, and behind which the sharpened prongs 25 are disposed when in set position. Thus, the two arched guards 36a are connected by an intermediate portion of the wire 40.

The latch 15 comprises an elongated latch arm 45 which is provided at its forward end with a coiled eye 46 which is disposed about the intermediate portion of the cross-rod 30 in the form of Fig. 5, or about the corresponding intermediate portion of the wire 40 between the arched guards 36a of the form of Fig. 6. This coiled eye 46 is thus pivotally mounted so that it may be swung between operative and inoperative positions upon the bearing provided by the mentioned intermediate portions of the cross-bar 30 or the wire 40. Above this bearing the latch 15 includes a rearwardly projecting nose 48 which is adapted to engage over the forwardmost portion of the bight 23 of the impaling arm 12, such engagement being adapted to be maintained through the medium of the trigger plate 16. This is accomplished when the trigger plate 16 is swung forward from the broken line position of Fig. 2 to the full line position so that the rearward end of the latch arm 45 extends into a trigger aperture 50 in the trigger plate 16. The trigger plate 16 is mounted upon a rearward portion of the impaling arm 12 by means of a wire bridge 52 whose ends are in the form of wrapped portions 52a disposed around adjacent rearward portions of the rails 22 of the arm 12 and held against sliding thereon as by means of soldering or welding. The middle portion of the bridge 52 is received in an elongated eye 54 on the corresponding edge of the trigger plate 16, this eye 54 being formed by wrapping the lower edge of the plate about the wire of the bridge, sufficient looseness being provided so that the trigger plate 16 may be swung freely between the various positions indicated.

The safety hook 17, in the form shown, is a looped wire having two legs 60 connected by a bight 17a bent to form a hook portion which is adapted to be hooked over the bight 23 of the impaling arm 12 as indicated in Fig. 1A. The ends of the two legs 60 are formed into eyes 62 wrapped around the middle portion of the rod 30, or wire 40, to provide bearing means at opposite sides of the trigger nose 48 and its pivot eye 46.

The use of the trap of this invention has been in general disclosed above. To state the same further, the trap normally will be found in the inoperative position illustrated in Fig. 3. In order to set the trap, the impaling arm 12 is depressed as indicated in Figs. 1 and 2 until it lies between the legs 21 of the base member 10 and the sharpened prongs 25 lie behind the arched guards 36. In accomplishing such depression, the intermediate portion 26a of the wire 26 serves as a thumb rest. The safety hook 17, if used, is then swung over the bight 23 to the position of Fig. 1A, thereby holding the impaling arm 12 in a depressed position. The arm 45 of the latch 15 will have been swung up from some such position as seen in full lines in Fig. 3 to a position approximately as indicated in broken lines in Fig. 3, so that the latch nose 48 is readily brought above the bight 23 and between the sides of the hook 17. The trigger plate 16 is then swung from the full line position of Fig. 3 through the broken line position of Fig. 2 to the full line operative position of Fig. 2, the moving extremity of the latch arm 45 being disposed so that it will enter the trigger aperture 50 as the trigger plate 16 swings to such full line operative position. With the latch arm 45 disposed in this set position of Figs. 2 and 4, the nose 48 then overlies the bight 23 of the impaling arm 12 to retain the latter in its set position, the latch parts being retained by the trigger plate 16. The safety hook 17 is next swung out to an inoperative position, as indicated in Figs. 1, 2 and 4.

The set trap is then introduced into the gopher burrow with the front bar 18, the bail 14, and the prongs 25 leading. When a gopher approaches the trap, it passes through the bail 14 until it contacts the trigger plate 16 to release the latch 15, or until the trigger plate 16 is engaged by earth which the gopher pushes ahead of it, whereby the trigger plate 16 is swung to release the latch arm 45. The spring coils 20 serve to actuate the impaling arm 12 and drive the sharpened impaling prongs 25 upward as soon as the latch nose 48 has released the bight 23 on the end of the arm 12, the prongs 25 thus piercing the gopher's abdomen to assume a position somewhat as indicated by the broken line of Fig. 5. Under such conditions, the gopher is effectively held between the impaling arm 12 and the uppermost portion of the bail 14.

When a very small gopher burrow is encountered, the bail 14 may be removed so that the set trap appears as shown in Fig. 4. Such removal is accomplished merely by spreading the sides of the bail 14 so that the loops 14a are detached from the ends 30a of the cross-rod 30 or from the ends 40a of the wire 40 (Figs. 5 and 6). Under such conditions, the top wall of the gopher hole will serve the purpose of the bail 14, thus making it unnecessary to enlarge the gopher hole to admit the bail 14. When using either form, the arched guards 36 or 36a prevent the sharpened prongs 25 of the set trap from being engaged by the gopher so that the gopher will be no more disturbed than by small rocks lying in the burrow. At the same time the prongs 25 may be covered with earth, if desired, when setting the trap.

Since other modifications will occur to those skilled in the art, it is intended to protect all such variations as fall within the scope of the claims.

I claim as my invention:

1. A rodent trap comprising: a base member; a rodent engaging member carried on said base member; spring means for normally urging said engaging member away from said base member toward an engaging position; mounting means provided by said base member; retaining means having bearing means removably and detachably carried upon said mounting means of said base member, said retaining means being adapted to be engaged by said engaging member, when sprung, for limiting movement of said engaging member and for binding a rodent thereagainst under the influence of said spring means; and trigger and latch means for holding said engaging member in set position and adapted to be released by the rodent for springing the trap.

2. A trap as in claim 1 wherein said engaging member is provided with upstanding prong means and said retaining means is a bail of approximately inverted U-shape into which the end of said engaging member carrying said prong means projects and within which it works.

3. A trap as in claim 2 including a front bar providing guard means extending above and protecting said prong means when said trap is set.

4. A trap as in claim 1 wherein said retaining means is a bail unattached to said engaging member and within which one end of said engaging member moves and which is adapted to hold a rodent forced thereagainst by said engaging member.

5. A rodent trap comprising in combination: a base member; a front bar on said base member; an impaling member carried on said base member; spring means for normally urging said impaling member from said base member to a rodent-impaling position, said impaling member having upstanding sharpened prong means mounted on a moving end thereof adjacent said front bar for impaling a rodent through upward movement of said impaling member, said prong means extending above said base member when said impaling member is set; trigger and latch means for holding said impaling member down in set position adjacent said base member and for releasing said impaling member; and guard means carried by said front bar and upstanding adjacent said prong means in position to guard and protect said prong means when said impaling member is down in set position.

6. A combination as in claim 5 wherein said base member and said impaling member are formed of strong spring wire, an intermediate portion of such wire being formed into a spring coil adjacent the rear of the trap and providing said spring means.

7. A gopher trap comprising in combination: a base member in the form of a wire frame having two side members, a front cross-bar, and connected coil springs at its rear formed from continuations of said side members; a gopher engaging arm having two side members extending forward from said coil springs, the forward ends of said side members terminating adjacent said front cross-bar; upwardly extending prong means disposed on the forward end of said gopher engaging arm and movable directly upward from said front cross-bar under influence of the said coil springs to impale a gopher when actuated; releasable latch means for retaining said gopher engaging arm in set position; and spaced upstanding guard means on said crossbar to protect said prong means when said gopher engaging arm is retained by said latch means, said cross-bar providing between said spaced guard means a relatively depressed bearing section, and said latch means being pivotally mounted upon said bearing section.

8. A combination as in claim 7 including a bail attached to the forward portion of said frame, said bail overhanging the forward portion of said gopher engaging arm and limiting the upward movement of the latter, said bail and upstanding prong means cooperating for positive retention of a gopher trapped therebetween, said bail being movable on said frame and carrying means engaging said frame for limiting forward movement of said bail beyond the path of said prong means.

9. A rodent trap comprising in combination: a base member; an impaling member carried on said base member; spring means for normally urging said impaling member from said base member to a rodent-impaling position, said impaling member having upstanding sharpened prong means mounted on a moving end thereof for impaling a rodent through upward movement of said impaling member; trigger and latch means for holding said impaling member down in set position adjacent said base member and for releasing said impaling member; and a front bar on said base member providing two spaced guard means for said prong means and bearing means between said guard means, said latch means being pivotally mounted upon said bearing means.

10. A combination as in claim 7 including: safety catch means carried by said bearing section and adapted to engage said gopher engaging arm to hold said arm in a depressed position with respect to said base member during setting of said latch means.

11. A rodent trap comprising in combination: a base member in the form of a wire frame having two elongated side members, a front cross-bar, and connected coil springs at its rear formed from continuations of said side members; a rodent engaging arm having two elongated side members extending forward from said coil springs, the forward ends of said side members terminating adjacent said front cross-bar and being freely movable with respect to the front end of said base member and said cross-bar and unattached thereto; upwardly extending prong means disposed on the forward end of said rodent engaging arm and movable directly upward from said front cross-bar under influence of the said coil springs to impale a rodent when actuated; releasable latch means for retaining said rodent engaging arm in set position; and a bail connected to the forward end of said frame and overlying a forward portion of said rodent engaging arm for limiting upward movement of said arm and adapted to cooperate therewith for positive retention of a rodent trapped therebetween, said bail being movable on said frame and having means engaging said frame for limiting forward movement of the said bail beyond the path of said prong means.

12. A rodent trap comprising in combination: a base member having a rearward portion; a front cross-bar on said base member; a rodent engaging arm extending forward from said rearward portion to said cross-bar; spring means for normally urging said engaging arm upward from said base member to rodent engaging position; mounting means carried by the forward portion of said base member; a bail having bearing means movably mounted on said mounting means, said bail overhanging the forward portion of said engaging arm and limiting upward movement of the latter, said bail and forward portion of said engaging arm cooperating for retention of a rodent trapped thereby; and means carried by said bail and engaging said base member for limiting forward movement of said bail beyond the path of the forward end of said rodent engaging arm.

13. A combination as in claim 12 wherein the ends of said bail are expandable whereby said bearing means are disengageable from said mounting means.

14. A combination as in claim 12 wherein the forward end of said rodent engaging arm is provided with upwardly projecting prong means.

15. A combination as in claim 13 wherein the base engaging means of said bail includes hook means engaging said base member.

16. A rodent trap comprising in combination: a base member; an impaling member carried on said base member; spring means for normally urging said impaling member from said base member to a rodent-impaling position, said impaling member having upstanding sharpened prong means mounted on a moving end thereof for impaling a rodent through upward movement of said impaling member; latch means for holding said impaling member down in set position adjacent said base member and for releasing said impaling member; cross means at the forward end of said base member; spaced guard means carried by said cross means and upstanding to guard said prong means, said cross means thereby providing a relatively depressed bearing section between said spaced guard means; and safety catch means mounted upon said bearing section and adapted to engage the moving end of said impaling member to retain the latter in a depressed position while said latch means is being set.

WILLIAM T. CONRAD.

REFERENCES CITED

The following references are of record in the file of this patent:

UNITED STATES PATENTS

| Number | Name | Date |
|---|---|---|
| 1,481,222 | Odatey | Jan. 15, 1924 |
| 1,767,306 | Norman | June 24, 1930 |
| 1,819,546 | Easton | Aug. 18, 1931 |
| 1,972,641 | Barrett | Sept. 4, 1934 |